(12) United States Patent
Watanabe et al.

(10) Patent No.: US 12,090,975 B2
(45) Date of Patent: Sep. 17, 2024

(54) BRAKE CONTROL APPARATUS

(71) Applicant: Hitachi Astemo, Ltd., Hitachinaka (JP)

(72) Inventors: Asahi Watanabe, Hitachinaka (JP);
Toshiya Oosawa, Hitachinaka (JP);
Daisuke Nezu, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 380 days.

(21) Appl. No.: 17/641,227

(22) PCT Filed: Nov. 25, 2020

(86) PCT No.: PCT/JP2020/043782
§ 371 (c)(1),
(2) Date: Mar. 8, 2022

(87) PCT Pub. No.: WO2021/106924
PCT Pub. Date: Jun. 3, 2021

(65) Prior Publication Data
US 2022/0332302 A1    Oct. 20, 2022

(30) Foreign Application Priority Data

Nov. 29, 2019   (JP) ................................ 2019-216463

(51) Int. Cl.
| | |
|---|---|
| *B60T 13/68* | (2006.01) |
| *B60T 8/1755* | (2006.01) |
| *B60T 8/40* | (2006.01) |
| *B60T 13/14* | (2006.01) |

(52) U.S. Cl.
CPC .......... *B60T 13/686* (2013.01); *B60T 8/1755* (2013.01); *B60T 8/4081* (2013.01); *B60T 13/147* (2013.01)

(58) Field of Classification Search
CPC ...... B60T 13/68; B60T 13/386; B60T 13/147; B60T 13/18; B60T 13/20; B60T 13/16; B60T 13/66; B60T 13/662; B60T 8/1755; B60T 8/4081; B60T 8/409; B60T 2270/402
See application file for complete search history.

(56) References Cited

U.S. PATENT DOCUMENTS

| | | | |
|---|---|---|---|
| 2013/0080017 A1* | 3/2013 | Bohm | B60T 7/042 |
| | | | 701/93 |
| 2016/0082937 A1 | 3/2016 | Nakaoka et al. | |
| 2021/0221345 A1* | 7/2021 | Maruo | B60T 7/042 |
| 2022/0324430 A1* | 10/2022 | Watanabe | B60T 17/221 |
| 2022/0332302 A1* | 10/2022 | Watanabe | B60T 13/18 |

FOREIGN PATENT DOCUMENTS

| | | | |
|---|---|---|---|
| JP | 2017213979 A * | 12/2017 | ............ B60T 13/142 |
| WO | WO 2014/184840 A1 | 11/2014 | |
| WO | WO-2018168307 A1 * | 9/2018 | ............ B60T 13/146 |

OTHER PUBLICATIONS

International Search Report (PCT/ISA/210) issued in PCT Application No. PCT/JP2020/043782 dated Dec. 22, 2020 with English translation (five (5) pages).
Japanese-language Written Opinion (PCT/ISA/237) issued in PCT Application No. PCT/JP2020/043782 dated Dec. 22, 2020 with English translation (six (6) pages).

* cited by examiner

*Primary Examiner* — Thomas J Williams
(74) *Attorney, Agent, or Firm* — Crowell & Moring LLP

(57) ABSTRACT

When another pump is actuated while a pump is de-actuated, a pressure adjustment valve is brought into a valve-opened state after a shut-off valve is actuated in a valve-opening direction and the another pump is actuated.

12 Claims, 9 Drawing Sheets

BRAKE CONTROL APPARATUS

TECHNICAL FIELD

The present invention relates to a brake control apparatus.

BACKGROUND ART

PTL 1 discloses a brake control apparatus including two hydraulic pressure sources. A first hydraulic pressure source is driven according to a braking request from a driver or a vehicle system, and increases a pressure in each wheel cylinder. A second hydraulic pressure source is driven at the time of intervention of vehicle stabilization control such as electronic stability control, and increases a pressure in a wheel cylinder on a control target wheel.

CITATION LIST

Patent Literature

PTL 1: International Publication No. 2014-184840

SUMMARY OF INVENTION

Technical Problem

In the brake control apparatus discussed in the above-described patent literature, PTL 1, a shut-off valve provided in a fluid passage connecting a reservoir tank and an intake side of the second hydraulic pressure source functions as an orifice when the second hydraulic pressure source is driven with no control request issued, thereby raising a possibility of reducing the performance of increasing the pressure by the second hydraulic pressure source.

An object of the present invention is to provide a brake control apparatus capable of preventing the reduction in the performance of increasing the pressure when the second hydraulic pressure source is actuated while the first hydraulic pressure source is de-actuated.

Solution to Problem

In a brake control apparatus according to one aspect of the present invention, a switching valve is brought into a valve-opened state after a shut-off valve is actuated in a valve-opening direction and a second hydraulic pressure source is actuated, when the second hydraulic pressure is actuated while a first hydraulic pressure source is de-actuated.

According to the one aspect of the present invention, the brake control apparatus can prevent a reduction in the performance of increasing the pressure when the second hydraulic pressure is actuated while the first hydraulic pressure source is de-actuated.

DESCRIPTION OF EMBODIMENTS

Figure 1:
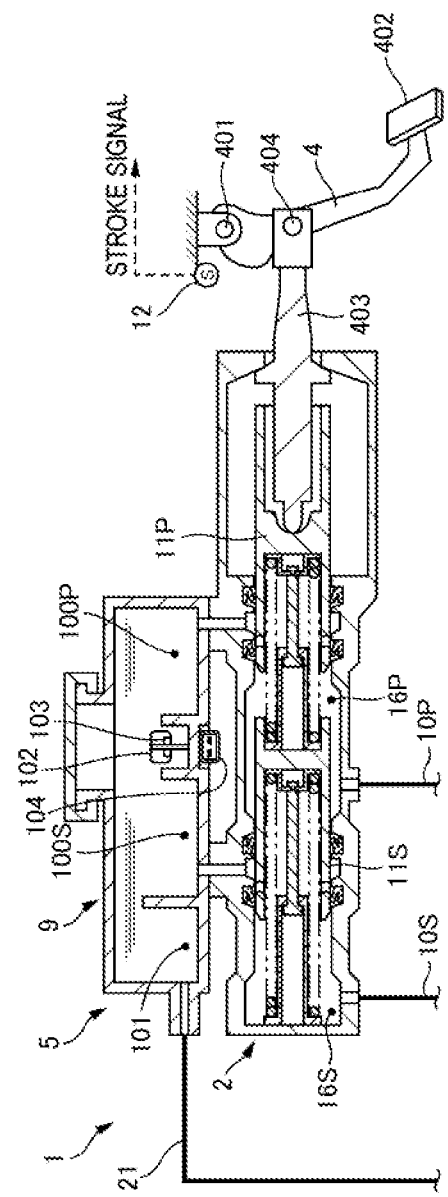
FIG. 1 illustrates the configuration of a master cylinder unit 5 in a brake control apparatus 1 according to a first embodiment.
Figure 2:
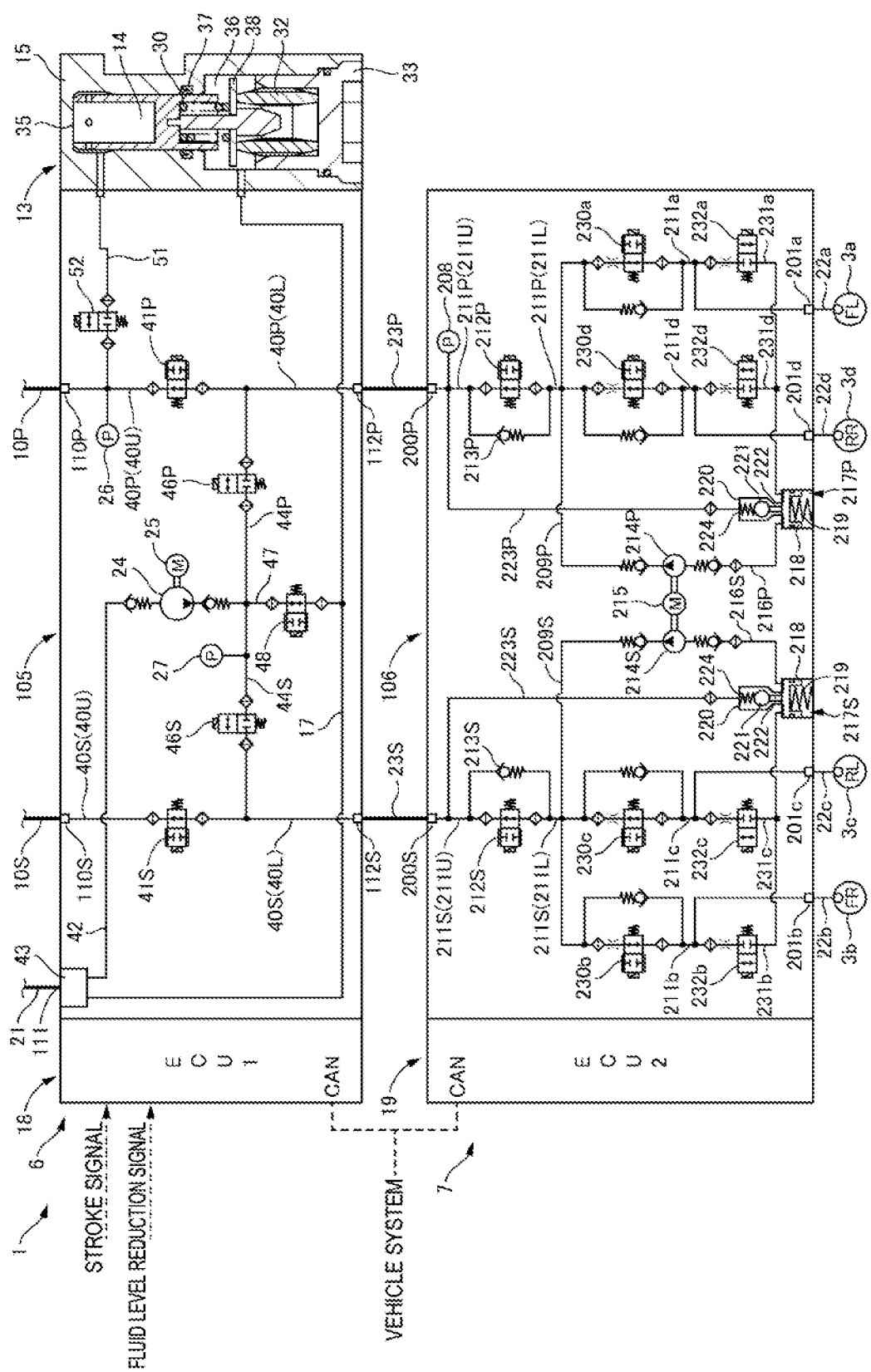
FIG. 2 illustrates the configurations of a first unit 6 and a second unit 7 in the brake control apparatus 1 according to the first embodiment.

[First Embodiment] FIG. 1 illustrates the configuration of a master cylinder unit 5 in a brake control apparatus 1 according to a first embodiment. FIG. 2 illustrates the configurations of a first unit 6 and a second unit 7 in the brake control apparatus 1 according to the first embodiment. The brake control apparatus 1 is applied to an electric vehicle. Examples of the electric vehicle include an electric automobile using a motor as a power source that drives wheels, and a hybrid vehicle that uses an internal combustion engine and a motor as the power source. The brake control apparatus 1 can also be applied to a vehicle using only an internal combustion engine as the power source. At each portion illustrated in FIGS. 1 and 2, P placed at the end of the reference numeral indicates that this portion corresponds to a primary system (a P system) of a master cylinder 2. S placed at the end of the reference numeral indicates that this portion corresponds to a secondary system (an S system) of the master cylinder 2. Hereinafter, when the P and S systems are not distinguished from each other, the indexes P and S will be omitted. Further, a placed at the end of the reference numeral indicates that this portion corresponds to a front left wheel FL. Similarly, b placed at the end, c placed at the end, and d placed at the end indicate that these portions correspond to a front right wheel FR, a rear left wheel RL, and a rear right wheel RR, respectively. When these wheels FL to RR are not distinguished from one another, the indexes a, b, c, and d will be omitted.

The brake control apparatus 1 generates a brake hydraulic pressure (a wheel cylinder hydraulic pressure) in a wheel cylinder (a braking force application portion) 3 using a hydraulic brake, thereby pressing brake pads mounted on each of the wheels FL to RR against a brake disk mounted on the wheel side and applying a braking force to each of the wheels FL to RR.

A brake pedal 4 is a brake operation member that receives an input of a driver's brake operation. The brake pedal 4 is a so-called suspended-type brake pedal, and the proximal end of the pedal is supported rotatably by a shaft 401. One end of a push rod 403 is connected rotatably via a shaft 404 to the proximal end side of the brake pedal 4 between the shaft 401 and a pad 402.

The brake control apparatus 1 includes the master cylinder unit 5, the first unit 6, and the second unit 7.

The master cylinder unit 5 is a unit in which the master cylinder 2 and a reservoir tank 9 are integrally provided.

The master cylinder 2 is actuated by an operation performed by the driver on the brake pedal 4 (the brake operation), and generates a brake hydraulic pressure (a master cylinder hydraulic pressure) according to a brake operation amount. The master cylinder 2 does not include a negative-pressure booster that boosts or amplifies the force of the driver's brake operation (the force pressing the brake pedal 4) by utilizing, for example, an intake negative pressure of the engine. The master cylinder 2 is connected to the brake pedal 4 via the push rod 403, and is also replenished with the brake fluid from the reservoir tank 9. The master cylinder 2 is a tandem-type master cylinder, and includes a primary piston 11P and a secondary piston 11S in series as master cylinder pistons axially movable according to the brake operation. The primary piston 11P is connected to the push rod 403. The secondary piston 11S is configured as a free piston.

The reservoir tank 9 is a brake fluid source storing the brake fluid therein, and is a low-pressure portion opened to the atmospheric pressure. The inside of the reservoir tank 9 is partitioned by partition walls into three sections. A primary tank chamber 100P supplies the brake fluid to a primary chamber 16P of the master cylinder 2. A secondary tank chamber 100S supplies the brake fluid to a secondary chamber 16S of the master cylinder 2. A suction tank chamber 101 is connected to an internal fluid pool chamber 43 of a first hydraulic pressure unit 105, which will be described below, via a suction hose 21.

The brake control apparatus 1 includes a float 102, a magnet 103, and a fluid level switch 104 as a unit that detects the fluid surface level of the brake fluid stored in the reservoir tank 9. The float 102 is provided inside the reservoir tank 9. The float 102 is a material having lower specific gravity than the brake fluid, and is lifted/lowered in conjunction with the fluid surface by floating on the fluid surface of the brake fluid. The magnet 103 is fixed to a lower portion of the float 102. The fluid level switch 104 is installed on the outer side of the reservoir tank 9 and below the float 102. The fluid level switch 104 is a reed switch that is switched on/off according to the strength of a magnetic force. The fluid level switch 104 detects a reduction in the fluid level by being switched from ON to OFF due to the magnetic force of the magnet 103 when the fluid level reduces and the magnet 103 approaches thereto, and outputs a fluid level reduction signal to a first control unit (a control unit) 18. The first control unit 18 is connected to the fluid level switch 104 via a dedicated electric wire.

A stroke sensor 12 is provided on the brake pedal 4. The stroke sensor 12 is a brake operation amount detection portion, and detects a displacement amount of the brake pedal 4 (a pedal stroke) as a physical amount regarding the operation amount of the brake pedal 4 (the brake operation amount). For example, a rotational angle sensor capable of detecting the angle of the brake pedal 4 is used as the stroke sensor 12, and the stroke sensor 12 determines the pedal stroke based on the relationship between the detected angle and the pedal length of the brake pedal 4. Alternatively, a sensor that detects an axial displacement of the push rod 403 may be used as the stroke sensor 12, and the pedal stroke sensor 12 may determine the pedal stroke based on the axial displacement and the pedal ratio of the brake pedal 4. Now, the pedal ratio is a ratio according to the "principle of leverage", and the pedal stroke is determined by assuming that the shaft 401 of the brake pedal 4, the brake pad 402, and the connection shaft 404 of the push rod 403 are a fulcrum, a point of effort, and a point of load, respectively. The stroke sensor 12 may be provided in the master cylinder 2, and the displacement of the push rod 403 may be measured.

The first unit 6 is a unit in which a stroke simulator 13, a first hydraulic pressure unit 105, and the first control unit 18 are integrally provided.

The stroke simulator 13 is actuated according to the driver's brake operation. The primary piston 11P of the master cylinder 2 is moved according to the driver's brake operation, and the brake fluid pushed out by that flows into the stroke simulator 13, by which the pedal stroke is generated. The inside of the stroke simulator 13 is divided into two chambers, a positive pressure chamber 35 and a backpressure chamber 36, and a simulator piston 14 is inserted in a cylinder portion formed inside a simulator casing 15.

The simulator piston 14 is sealed by a cup seal 37. The cup seal 37 permits only a flow of the brake fluid in a direction from the backpressure chamber 36 to the positive pressure chamber 35, and prohibits a flow of the brake fluid in a direction from the positive pressure chamber 35 to the backpressure chamber 36. Therefore, a pressure for moving the simulator piston 14 is generated in the positive pressure chamber 35 due to an inflow from the master cylinder 2 side into the stroke simulator 13. A spring member 30 and a rubber member 32 are held in the backpressure chamber 36 with use of a retainer 38 and a plug 33. Therefore, when the simulator piston 14 is displaced, the spring member 30 and the rubber member 32 are compressed, by which a reaction force is generated. As a result, due to the establishment of balance between the pressure in the positive pressure chamber 35 and the reaction force generated due to the compression of the spring member 30 and the rubber member 32, a natural pedal feeling is generated.

The first hydraulic pressure unit 105 is connected to the master cylinder 2 via master cylinder pipes 10. Further, the first hydraulic pressure unit 105 is connected to the suction tank chamber 101 of the reservoir tank 9 via the suction hose 21. The first hydraulic pressure unit 105 and a second hydraulic pressure unit 106 are connected to each other via unit connection pipes 23. The second hydraulic pressure unit 106 is connected to the wheel cylinders 3 via wheel cylinder pipes 22. The brake control apparatus 1 employs a so-called X (cross) piping configuration, in which the primary system of the second hydraulic pressure unit 106 is connected to the front left-wheel wheel cylinder 3a and the rear right-wheel wheel cylinder 3d while the secondary system is connected to the front right-wheel wheel cylinder 3b and the rear left-wheel wheel cylinder 3c. The brake control apparatus 1 may employ an H piping configuration, in which the front wheels are connected to the primary system and the rear wheels are connected to the secondary system.

The first hydraulic pressure unit 105 includes first input ports 110, a suction port 111, and first output ports 112. A first input port 110P of the P system is connected to a master cylinder pipe 10P. A first input port 110S of the S system is connected to a master cylinder pipe 10S. The suction port 111 is connected to the suction hose 21. A first output port 112P of the P system is connected to a unit connection pipe 23P. A first output port 112S of the S system is connected to a unit connection pipe 23S. The first input port 110P and the first output port 112P of the P system are connected to each other via a first connection fluid passage 40P. The first input port 110S and the first output port 112S of the S system are connected to each other via a first connection fluid passage 40S. Shut-off valves 41 are provided in the first connection fluid passages 40. The shut-off valves 41 are normally-opened proportional control valves (electromagnetic valves). A shut-off valve 41P is provided in the first connection fluid passage 40P, and a shut-off valve 41S is provided in the first connection fluid passage 40S. Each of the first connection fluid passages 40 branches into an upstream-side fluid passage 40U on the master cylinder 2 side and a downstream-side fluid passage 40L on the wheel cylinder 3 side by the shut-off valve 41.

A hydraulic pressure sensor 26 is provided in the upstream-side fluid passage 40U of the P system. The hydraulic pressure sensor 26 detects the master cylinder hydraulic pressure. A simulator fluid passage 51 branches off from the upstream-side fluid passage 40U of the P system. The simulator fluid passage 51 is connected to the positive pressure chamber 35 of the stroke simulator 13. A simulator valve 52 is provided in the simulator fluid passage 51. The simulator valve 52 is a normally-closed (kept in a valve-closed state when no power is supplied thereto) ON/OFF valve (electromagnetic valve).

The downstream-side fluid passage 40L (40P) of the P system and the downstream-side fluid passage 40L (40S) of the S system are connected to each other via communication fluid passages 44. The communication fluid passages 44 include a communication fluid passage 44P connected to the downstream-side fluid passage 40L (40P) of the P system, and a communication fluid passage 44S connected to the downstream-side fluid passage 40L (40S) of the S system. Communication valves 46 are provided in the communication fluid passages 44. The communication valves 46 are normally-closed ON/OFF valves (electromagnetic valves). A hydraulic pressure sensor 27 is provided in the communication fluid passage 44S of the S system. The hydraulic pressure sensor 27 detects the discharge pressure of a pump 24 (a first hydraulic pressure source).

The first hydraulic pressure unit 105 includes the pump (a first hydraulic pressure source) 24 and a motor 25 serving as a driving source thereof. The pump 24 is a plunger pump. The motor 25 is, for example, a brushless motor. The flow rate of the pump 24 can be adjusted by controlling the rotational speed of the motor 25. An intake fluid passage 42 is connected to the intake side of the pump 24. The intake fluid passage 42 is connected to the internal fluid pool chamber 43. The internal fluid pool chamber 43 is connected to the suction hose 21 at the suction port 111, and receives supply of the brake fluid from the reservoir tank 9. The internal fluid pool chamber 43 has a predetermined volume, and allows the brake fluid to be continuously supplied to the pump 24 due to the brake fluid contained in the internal fluid pool chamber 43 even when, for example, a leak failure has occurred in the suction hose 21 and the supply of the brake fluid cannot be received from the reservoir tank 9. The output side of the pump 24 is connected to the communication fluid passages 44.

The communication fluid passages 44 are connected to a pressure reduction fluid passage 47. The pressure reduction fluid passage 47 is further connected to a return flow fluid passage 17. The return flow fluid passage 17 is a low-pressure portion opened to the atmospheric pressure, and is connected to the internal fluid pool chamber 43. A pressure adjustment valve (a switching valve) 48 is provided in the pressure reduction fluid passage 47. The pressure adjustment valve 48 is a normally-opened proportional control valve (electromagnetic valve).

The first control unit 18 is an electronic control unit (ECU) that controls the first hydraulic pressure unit 105. The first control unit 18 is connected to the stroke sensor 12 via a dedicated electric wire (a power source line, a ground line, and a signal line). The first control unit 18 calculates a target wheel cylinder hydraulic pressure according to the pedal stroke detected by the stroke sensor 12. For example, the relationship between the pedal stroke and the target wheel cylinder hydraulic pressure is stored in the form of a table in advance, and the target wheel cylinder hydraulic pressure is determined according to the value detected by the stroke sensor 12. Further, the first control unit 18 controls each of the electromagnetic valves and the motor 25 in the first hydraulic pressure unit 105. For example, the first control unit 18 actuates the shut-off valves 41 in the valve-closing directions to thus block the flow of the brake fluid in the master cylinder 2 according to the driver's brake operation, and also actuates the simulator valve 52 in the valve-opening direction to thus guide the brake fluid in the master cylinder 2 to the stroke simulator 13, thereby creating a pedal stroke and an appropriate reaction force.

On the other hand, when detecting the generation of the target wheel cylinder hydraulic pressure according to the driver's brake operation, the first control unit 18 drives the motor 25 to actuate the pump 24, and, at the same time, actuates the communication valves 46 in the valve-opening directions and the pressure adjustment valve 48 in the valve-closing direction, thereby causing the brake fluid discharged from the pump 24 to flow from the communication fluid passages 44 to the first connection fluid passages 40. At this time, since the shut-off valves 41 are closed, the brake fluid flows into the unit connection pipes 23 and flows into each of the wheel cylinders 3 via the second hydraulic pressure unit 106, thereby generating the wheel cylinder hydraulic pressure. In this case, the communication fluid passages 44 are in the connected states, and form one system of hydraulic pressure circuit. Therefore, all of the wheel cylinder hydraulic pressures are adjusted to the same pressure, and therefore the wheel cylinder hydraulic pressures can be measured by the hydraulic pressure sensor 27.

The first control unit 18 controls the inflow amount of the brake fluid into the wheel cylinders 3 with use of the rotational speed of the motor 25 according to hydraulic pressure feedback using the hydraulic pressure sensor 27. At the same time, the first control unit 18 adjusts the outflow amount by adjusting the opening degree of the pressure adjustment valve 48 to cause the brake fluid to flow to the pressure reduction fluid passage 47 side. Therefore, the first control unit 18 can arbitrarily increase/reduce the brake fluid amount to be supplied to the wheel cylinders 3, thereby realizing wheel cylinder hydraulic pressure control aiming at causing the wheel cylinder hydraulic pressure to match the target wheel cylinder hydraulic pressure.

Further, the first connection fluid passages 40, which connect the brake pedal 4 and the wheel cylinders 3, each branch into the upstream-side fluid passage 40U and the downstream-side fluid passage 40L by the shut-off valve 41, and this configuration can realize a so-called brake-by-wire state, in which no change occurs on the brake pedal 4 at all even when the wheel cylinder hydraulic pressure is arbitrarily adjusted. The target wheel cylinder hydraulic pressure is not dependent only on the pedal stroke. A request for autonomous brake (for example, collision reduction brake and adaptive cruise control) is issued from the vehicle system, and a request for control of frictional brake is issued from a regenerative cooperative brake function. A communication unit is provided in the first control unit 18 to input these requests via the vehicle side and a CAN (control area network).

The second unit 7 is a unit in which the second hydraulic pressure unit 106 and a second control unit (the control unit) 19 are integrally provided.

The second hydraulic pressure unit 106 can control the wheel cylinder hydraulic pressures in the P system and the S system independently with use of the brake fluid flowing in from the unit connection pipes 23. Further, the second hydraulic pressure unit 106 can control the brake hydraulic pressure in each of the wheel cylinders 3a to 3d independently. The second hydraulic pressure unit 106 according to the first embodiment is configured similarly to a brake control apparatus used in a commonly-used electronic stability controller (ESC).

The second hydraulic pressure unit 106 includes second input ports 200 and second output ports 201. A second input port 200P of the P system is connected to the unit connection pipe 23P. A second input port 200S of the S system is connected to the unit connection pipe 23S. The second output ports 201 are connected to the wheel cylinder pipes 22. The second input port 200P of the P system is connected to a second connection fluid passage 211P. The second input port 200S of the S system is connected to a second connection fluid passage 211S. The second connection fluid passage 211P of the P system branches into a second connection fluid passage 211a and a second connection fluid passage 211d, and is connected to second output ports 201a and 201d. The second connection fluid passage 211S of the S system branches into second connection fluid passages 211b and 211c, and is connected to second output ports 201b and 201c.

A gate valve 212P is provided in the second connection fluid passage 211P of the P system. A gate valve 212S is provided in the second connection fluid passage 211S of the S system. The second connection fluid passages 211 each branch into an upstream-side fluid passage 211U on the master cylinder 2 side and a downstream-side fluid passage 211L on the wheel cylinder 3 side by the gate valve 212. Check valves 213 are provided in the second connection fluid passages 211 in parallel with the gate valves 212. The check valves 213 each permit only a flow of the brake fluid in a direction from the second input port 200 to the second output port 201, and prohibit a flow of the brake fluid in a direction from the second output port 201 to the second input port 200.

The second connection fluid passage 211P branches into the second connection fluid passages 211a and 211d, and the second connection fluid passage 211S branches into the second connection fluid passages 211b and 211c. Pressure increase valves 230a to 230d are provided in the second connection fluid passages 211a to 211d, respectively. The pressure increase valves 230a to 230d are normally-opened proportional control valves (electromagnetic valves). Pressure reduction fluid passages 231a to 231d are connected to the second output port 201a to 201d sides of the second connection fluid passages 211a to 211d with respect to the pressure increase valves 230a to 230d, respectively. The pressure reduction fluid passages 231a and 231d are connected to a reservoir 217P after being merged. The pressure reduction fluid passages 231b and 231c are connected to a reservoir 217S after being merged. Communication valves 232 are provided in the pressure reduction fluid passages 231. The communication valves 232 are normally-closed ON/OFF valves (electromagnetic valves). A hydraulic pressure sensor 208 is provided on the second input port 200P side of the second connection fluid passage 211P of the P system with respect to the gate valve 212P. The hydraulic pressure sensor 208 detects a hydraulic pressure at this position.

The second hydraulic pressure unit 106 includes a P-system pump (a second hydraulic pressure source) 214P and an S-system pump (the second hydraulic pressure pump) 214S, and a motor 215 serving as the driving source of them. Both the pump 214P and the pump 214S are plunger pumps. The motor 215 is, for example, a brushless motor. The flow rates of the pump 214P and the pump 214S can be adjusted by controlling the rotational speed of the motor 215. Intake fluid passages 216 are connected to the intake sides of the pumps 214. The intake fluid passages 216 are connected to the reservoirs 217. The discharge side of the pump 214P of the P system is connected to a discharge fluid passage 209P. The discharge side of the pump 214S of the S system is connected to a discharge fluid passage 209S. The discharge fluid passage 209P of the P system is connected to the second output port 201a and 201d side of the second connection fluid passage 211P with respect to the gate valve 212P. The discharge fluid passage 209S of the S system is connected to the second output port 201b and 201c side of the second connection fluid passage 211S with respect to the gate valve 212S.

The reservoirs 217 each include a reservoir piston 218, a reservoir spring 219, and a check valve 220. The reservoir piston 218 is provided so as to be able to conduct a vertical stroke inside the reservoir 217. The reservoir piston 218 is moved downward and upward according to an increase and a reduction in the brake fluid amount flowing into the reservoir 217, respectively. The reservoir spring 219 biases the reservoir piston 218 in the upward direction. The check valve 220 includes a ball valve 221 and a valve seat 222. The ball valve 221 is vertically moved by a poppet portion provided integrally with the reservoir piston 218, thereby being able to mechanically control the opening/closing state between the ball valve 221 and the valve seat 222 according to the stroke of the reservoir piston 218.

The ball valve 221 is biased by a valve spring 224 in the downward direction. The elastic force of the valve spring 224 is set to a weaker force than the elastic force of the reservoir spring 219. When the reservoir piston 218 is moved downward, the valve seat 222 and the ball valve 221 are brought into abutment with each other when the ball valve 221 is moved downward. The other sides of the check valves 220 are connected to intake connection fluid passages 223. The intake connection fluid passages 223 are connected to the second input port 200 sides of the second connection fluid passages 211 with respect to the gate valves 212. Further, the reservoirs 217 are connected to the pressure reduction fluid passages 231. The reservoirs 217 store the brake fluid flowing out of the wheel cylinders 3 into the pressure reduction fluid passages 231. The brake fluid stored in the reservoirs 217 is returned to the second connection fluid passages 211 by the actuation of the pumps 214.

In the brake control apparatus 1 according to the first embodiment, the master cylinder fluid chambers 16, the master cylinder pipes 10, the first connection fluid passages 40, the unit connection pipes 23, the second connection fluid passages 211, and the wheel cylinder pipes 22 correspond to a connection fluid passage that connects the reservoir tank 9 and the wheel cylinders 3, which apply the braking forces to the wheels FL to RR according to the brake hydraulic pressures, respectively. The fluid passages between the shut-off valves 41 and the wheel cylinders 3 in the connection fluid passage (the downstream-side fluid passages 40L, the unit connection fluid passages 23, the second connection fluid passages 211, and the wheel cylinder pipes 22) correspond to a first fluid passage. The fluid passages between the shut-off valves 41 and the gate valves 212 in the first fluid passage (the downstream-side fluid passages 40L, the unit connection pipes 23, and the upstream-side fluid passages 211U) corresponds to a second fluid passage.

Further, the suction hose 21, the internal fluid pool chamber 43, the intake fluid passage 42, and the communication fluid passages 44 correspond to a first brake fluid supply fluid passage that connects the reservoir tank 9 and the second fluid passage (the downstream-side fluid passages 40L). The fluid passages between the gate valves 212 and the wheel cylinders 3 in the first fluid passage (the downstream-side fluid passages 211L and the wheel cylinder pipes 22) correspond to a third fluid passage. The intake connection fluid passages 223, the intake fluid passages 216, and the discharge fluid passages 209 correspond to a second brake fluid supply fluid passage that connects the second fluid passage (the upstream-side fluid passages 211U) and the third fluid passage (the downstream-side fluid passages 211L). The pressure reduction fluid passage 47 is a bypass fluid passage that connects the reservoir tank 9 and the second fluid passage (the downstream-side fluid passages 40L). The pressure reduction fluid passage 47 is connected to the second fluid passage (the downstream-side fluid passages 40L) via the first brake fluid supply fluid passage (the communication fluid passages 44).

The second control unit 19 is an electronic control unit (ECU) that controls the second hydraulic pressure unit 106. The second control unit 19 calculates a vehicle behavior state based on values detected by a wheel speed sensor mounted on each of the wheels FL to RR, a longitudinal acceleration sensor, a yaw rate sensor, and the like. For example, the second control unit 19 performs ABS control if a currently braked wheel has a lock tendency and performs ESC control if the vehicle is in a skidding state as a result of the calculation of the vehicle behavior state. For example, in the ESC control, if determining the skidding state based on the behavior state of the vehicle targeted for the control, the second control unit 19 calculates the target wheel cylinder hydraulic pressure for resolving the skidding and actuates the second hydraulic pressure unit 106 in such a manner that the wheel cylinder hydraulic pressure matches the target wheel cylinder hydraulic pressure.

The second control unit 19 includes a communication unit for outputting the calculated vehicle behavior state to the vehicle side via the CAN. The first control unit 18 and the second control unit 19 transmit and receive data via the CAN.

Then, the second control unit 19 does not include a hydraulic pressure sensor that actually measures the wheel cylinder hydraulic pressure, and therefore should estimate the wheel cylinder hydraulic pressure to allow the wheel cylinder hydraulic pressure to follow the target wheel cylinder hydraulic pressure in the ABS control or the ECS control. One example thereof will be described now.

For example, when the first hydraulic pressure unit 105 is not in operation, such as when the driver does not operate the brake pedal 4, the hydraulic pressures at the second input ports 200 are zero. Suppose that, from this state, the ESC control is performed based on the result of the calculation of the vehicle behavior state, and the target wheel cylinder hydraulic pressure is generated for the front left wheel FL to slow down the vehicle while being set to zero for each of the other wheels FR, RL, and RR.

The second control unit 19 drives the motor 215 to actuate the pumps 214P and 214S of both the systems, and, at the same time, actuates the gate valve 212P in the valve-closing direction. The subsequent description will continue focusing on the P system. The brake fluid is supplied to the pump 214P via the intake connection fluid passage 223P, the reservoir 217P, and the intake fluid passage 216, and is discharged from the pump 214P to the discharge fluid passage 209P. Since the gate valve 212P is in the valve-closed state, the brake fluid flows from the second connection fluid passage 211 to each of the second connection fluid passage 211a of the front left wheel FL and the second connection fluid passage 211d of the rear right wheel RR, and can increase the pressure in each of the wheel cylinder 3a on the front left wheel FL and the wheel cylinder 3d on the rear right wheel RR.

At this time, the brake fluid can be supplied only to the front left wheel FL and the pressure can be increased only in the wheel cylinder 3a on the front left wheel FL by actuating the pressure increase valve 230a in the valve-opening direction and actuating the pressure increase valve 230d in the valve-closing direction. The wheel cylinder hydraulic pressure at this time can be estimated based on the brake fluid amount transmitted into the wheel cylinder 3a on the front left wheel FL and the wheel cylinder 3d on the rear right wheel RR. The brake fluid amount transmitted into the wheel cylinder 3a on the front left wheel FL and the wheel cylinder 3d on the rear right wheel RR can be estimated by calculating the pump flow rate based on the rotational speed of the motor 215 and the passage flow rate based on the opening/closing state of the pressure-increase valve 230 and calculating a cumulative value. The brake fluid amount and the wheel cylinder hydraulic pressure are correlated, and a conversion from the brake fluid amount into the hydraulic pressure (the pressure) is also possible. Therefore, the wheel cylinder hydraulic pressure can be estimated.

Next, regarding the S system (the front right wheel FR and the rear left wheel RL), keeping the gate valve 212S actuated in the valve-opening direction allows the brake fluid discharged from the pump 214S into the discharge fluid passage 209S to return by passing through the gate valve 212S and flowing into the intake connection fluid passage 223S. Therefore, no brake fluid flows into the wheel cylinder 3b on the front right wheel FR and the wheel cylinder 3c on the rear left wheel RL, and therefore the pressures can be kept at zero therein. In this manner, the wheel cylinder hydraulic pressure in each of the wheel cylinders 3 can be independently controlled to an arbitrary pressure by controlling the pumps 214 and each of the electromagnetic valves in the second hydraulic pressure unit 106 in the second control unit 19.

Next, the operation of the brake control apparatus 1 according to the first embodiment will be described.

(Normal Brake Control) Normal brake control refers to brake control that generates appropriate deceleration according to the pedal stroke generated by the driver's brake operation. In the normal brake control, the brake control apparatus 1 performs boosting control that assists the brake operation by generating a brake hydraulic pressure by which the driver's brake pressing force is insufficient. The normal brake control is realized by the operation of the first hydraulic pressure unit 105. The first control unit 18 converts the signal output from the stroke sensor 12 into the pedal stroke, and calculates the target wheel cylinder hydraulic pressure according to the pedal stroke. The first control unit 18 realizes the wheel cylinder hydraulic pressure control by actuating each of the electromagnetic valves and the motor 25 in the first hydraulic pressure unit 105 according to the target wheel cylinder hydraulic pressure, and using the value detected by the hydraulic pressure sensor 27 for the feedback. At the same time, the stroke simulator 13 is actuated and generates a natural pedal feeling, and therefore the driver can acquire a comfortable braking feeling.

(Autonomous Brake Control) Autonomous brake control refers to brake control that generates deceleration in reaction to a request from the vehicle system with no brake operation input by the driver. The autonomous brake control is realized by the operation of the first hydraulic pressure unit 105. The first control unit 18 calculates the target wheel cylinder hydraulic pressure to realize a target value of the autonomous brake input via the CAN. The target value of the autonomous brake may be any physical amount regarding braking, such as an acceleration and a deceleration of the vehicle. The first control unit 18 realizes the wheel cylinder hydraulic pressure control by actuating each of the electromagnetic valves and the motor 25 in the first hydraulic pressure unit 105 according to the target wheel cylinder hydraulic pressure, and using the value detected by the hydraulic pressure sensor 27 for the feedback.

(Vehicle Stabilization Control) Vehicle stabilization control refers to brake control aiming to stabilize the vehicle by applying the braking force to each of the wheels FL to RR independently, and a function as a commonly-used electronic stability controller (ESC) such as an ABS (an antilock brake system), a TCS (a traction control system), and an LDP (lane departure prevention support system). The vehicle stabilization control is realized by the operation of the second hydraulic pressure unit 106. The second control unit 19 estimates the state of the vehicle based on each wheel speed, the longitudinal acceleration, the lateral acceleration, the yaw rate, the steering angle, the engine torque, and the like, and independently controls each wheel cylinder hydraulic pressure.

(Backup Control) Backup control refers to control that the second unit 7 substitutes to perform the brake control when a failure has occurred in the first unit 6 and makes it impossible to perform the normal brake control or the autonomous brake control. An example expected as the failure in the first unit 6 is a failure that makes the control impossible mainly due to a malfunction in the electronic system, such as short-circuiting of the valve solenoid in the first hydraulic pressure unit 105, a malfunction of the hydraulic pressure sensor 26 or 27 or a malfunction of the motor driving function, and a malfunction of the calculation function in the first control unit 18. Another expected example is a mechanical failure such as a leak of the brake fluid in the first hydraulic pressure unit 105. The first control unit 18 includes a unit that detects the above-described failure in the first unit 6, and takes a safety action such as causing the system to transition to a fallback or stop the operation according to a fail-safe when the failure is detected. When detecting the failure in the first unit 6, the first control unit 18 transmits this failure information to the second control unit 19 via the CAN. Further, the first control unit 18 de-actuates the first hydraulic pressure unit 105 (stops the power supply to all of the electromagnetic valves and the motor 25).

Now, with the brake control apparatus 1 in operation, each of the electromagnetic valves and the motor 25 of the first unit 6 are brought into an uncontrolled state in such a scene that the actuators in the first hydraulic pressure unit 105 do not have to be actuated, such as when a request for control such as the normal brake control and the autonomous brake control is not issued. Supposing that a control request for the vehicle stabilization control is issued in such a situation, the following consequence may arise in this case. Especially when the pressure should be increased in the wheel cylinder 3 on a specific wheel due to, for example, the electronic stability control function, the second hydraulic pressure unit 106 is actuated and the brake fluid is delivered into the wheel cylinder 3 on the control target wheel by the pump 214. The pump 214 sucks the brake fluid in an intake line and the reservoir tank 9 via the intake fluid passage 216, the intake connection fluid passage 223, the unit connection pipe 23, the first connection fluid passage 40, the master cylinder pipe 10, and the master cylinder hydraulic chamber 16 as the intake line. At this time, the shut-off valve 41 provided in the first connection fluid passage 40 has a small fluid passage cross-sectional area compared to the first connection fluid passage 40 and the master cylinder pipe 10, and therefore functions as an orifice and causes an increase in the resistance against the suction of the pump 214.

This results in a reduction in the discharge flow rate of the pump 214 and leads to a reduction in the performance of increasing the pressure in the wheel cylinder 3, thereby raising a possibility of making the vehicle stability control insufficient. Then, one conceivable method to reduce the resistance against the suction of the shut-off valve 41 is to design the flow passage cross-sectional area of the shut-off valve 41 to a relatively large area. However, increasing the fluid passage cross-sectional area of the shut-off valve 41 necessitates a further great electromagnetic force according to an increase in the size of the valve and an increase in the spring force for returning the valve body to the initial position, thereby leading to an increase in the size of the coil and an increase in the current of the coil. Further, Japanese Patent Application Public Disclosure No. 2016-147614 discloses a technique for increasing the intake efficiency of the pump in the vehicle stabilization control with use of pressurization control of increasing the pressure of the brake fluid in the intake line of the pump in advance, but leads to an increase in the power consumption amount because driving an electric cylinder.

In the first embodiment, the first control unit 18 performs brake control working as will be described below with the aim of preventing a reduction in the performance of increasing the pressure in the wheel cylinder 3 without leading to a size increase and an increase in the power consumption amount when a control request for the vehicle stabilization control is issued without both a control request for the normal brake control and a control request for the autonomous brake control issued.

Figure 3:
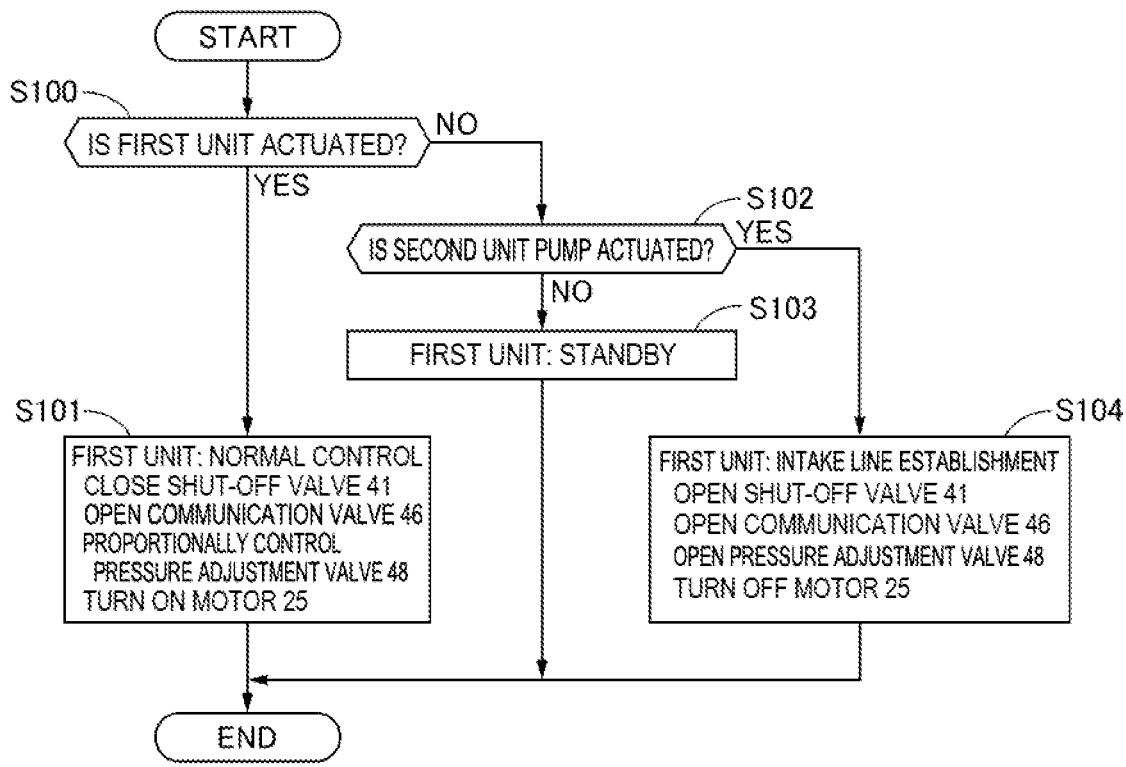
FIG. 3 is a flowchart illustrating a flow of brake control processing by a first control unit 18 according to the first embodiment.

FIG. 3 is a flowchart illustrating a flow of brake control processing by the first control unit 18 according to the first embodiment. This processing is embedded in the first control unit 18 as software, and is repeatedly performed per predetermined calculation cycle.

In step S100, the first control unit 18 determines whether the first unit 6 is actuated. If the determination in step S100 is YES, the processing proceeds to step S101. If the determination in step S100 is NO, the processing proceeds to step S102. In this step, the first control unit 18 determines whether the normal brake in response to a brake operation of the driver or the autonomous brake control in response to a braking request from the vehicle system is ongoing based on the actuated state/de-actuated state of the first unit 6. The de-actuated state is defined to also include such a state that each of the actuators is actuated to a degree of making the pressurization uninfluential. More specifically, the determination about the actuated/de-actuated state places importance on the pressure states in the first connection fluid passages 40 in the first unit 6 (≈the outputs of the hydraulic pressure sensors 27 and 208), and does not necessarily match an instruction value directed to each of the actuators. For example, during a transition of the first unit 6 from the controlled state to the non-controlled state, the first unit 6 is determined to be in the actuated state if the control pressure is in a state of being higher than a predetermined value (a low pressure equal to or lower than, for example, 1 Bar) (a state of making the pressurization influential) even when an instruction directed to each of the actuators is zero, and is determined to be in the de-actuated state if the control pressure is in a state of being equal to or lower than the predetermined value (a state of making the pressurization uninfluential).

In step S101, the first control unit 18 performs the normal brake control by the first unit 6. More specifically, the first control unit 18 actuates the shut-off valves 41 in the valve-closing directions, actuates the communication valves 46 in the valve-opening directions, proportionally controls the pressure adjustment valve 48, and drives the motor 25. Now, the proportional control on the pressure adjustment valve 48 refers to control of adjusting the opening degree of the pressure adjustment valve 48 in such a manner that the output pressure of the first unit 6 (≈the output of the hydraulic pressure sensor 27) matches the target pressure. If the pump 214 in the second unit 7 is actuated due to the intervention of the vehicle stabilization control at this time, the pump efficiency of the second unit 7 does not reduce. This is because the first unit 6 is in such a state that the pump 24 therein is actuated and pressures are generated in the first connection fluid passages 40, and therefore equal pressures are also generated in the intake fluid passage 216 and the intake connection fluid passage 223 of the pump 214, and sufficient intake efficiency can be secured due to these pressures.

In step S102, the first control unit 18 determines whether the pump 214 of the second unit 7 is actuated. If the determination in step S102 is YES, the processing proceeds to step S104. If the determination in step S102 is NO, the processing proceeds to step S103. In this step, the first control unit 18 determines the actuation state of the pump 214 based on whether there is control intervention of control such as the vehicle stabilization control and the backup control. The pump 214 is actuated in the vehicle stabilization control and the backup control, and therefore whether the pump 214 is actuated can be determined by monitoring the intervention of such control. Whether there is control intervention of the vehicle stabilization control can be determined based on whether a calculation result of the vehicle stabilization control in the second unit 7 is received by the communication unit.

In step S103, the first control unit 18 sets the first unit 6 into a standby state. Now, the standby state basically refers to a state that each of the electromagnetic valves and the motor 25 in the first unit 6 are de-actuated, but each of the electromagnetic valves and the motor 25 may be in any of the actuated state and the de-actuated state in the first embodiment.

In step S104, the first control unit 18 sets the first unit 6 into an intake line establishment state. More specifically, the first control unit 18 actuates the shut-off valve 41, the communication valve 46, and the pressure adjustment valve 48 in the valve-opening directions and de-actuates the motor 25 into a stopped state.

Next, functions and advantageous effects of the first embodiment will be described.

The first control unit 18 actuates the shut-off valve 41, the communication valve 46, and the pressure adjustment valve 48 in the valve-opening directions and de-actuates the motor 25 into the stopped state after the second control unit 19 actuates the pump 214 in the second unit 7 while the first unit 6 is de-actuated. The pressure adjustment valve 48 is brought into the valve-opened state after the second control unit 19 actuates the pump 214. More specifically, the pressure adjustment valve 48 is brought into the valve-opened state when the second fluid passage (the downstream-side fluid passage 40L, the unit connection pipe 23, and the upstream-side fluid passage 211U) has a negative pressure therein after the pump 214 is actuated by the second control unit 19.

As a result, two intake line systems for supplying the brake fluid to the pump 214 of the second unit 7 are established in the first unit 6. A first intake line is a conventionally-used intake line extending via the shut-off valve 41. More specifically, the first intake line is an intake line starting from the reservoir chamber 100 and reaching the second input port 200 of the second unit 7 via the master cylinder fluid chamber 16, the master cylinder pipe 10, the upstream-side fluid passage 40U, the shut-off valve 41, the downstream-side fluid passage 40L, and the unit connection pipe 23. On the other hand, a second intake line is an intake line extending via the pressure adjustment valve 48. More specifically, the second intake line is an intake line starting from the reservoir chamber 100 and reaching the second input port 200 of the second unit 7 via the suction hose 21, the internal fluid pool chamber 43, the return flow fluid passage 17, the pressure reduction fluid passage 47 including the pressure adjustment valve 48, the downstream-side fluid passage 40L, and the unit connection pipe 23.

The pump intake efficiency of the second unit 7 reduced due to the resistance of the shut-off valve 41 in the first intake line can be compensated for with use of the second intake line by establishing the second intake line in addition to the first intake line in this manner. As a result, the brake control apparatus 1 can prevent a reduction in the controllability of the electronic stability control due to a reduction in the performance of increasing the pressure by the pump 214. A reason therefor will be described below in detail.

The first intake line and the second intake line are parallel fluid passages provided between the reservoir tank 9 and the downstream-side fluid passage 40L. Generally, an equivalent cross-sectional area of parallel orifices can be deemed to be a sum of the cross-sectional areas of the respective orifice portions. When the fluid passage cross-sectional areas of the external pipes (the master cylinder pipe 10 and the like) and the fluid passages in the hydraulic pressure unit (the first connection fluid passage 40 and the like) are sufficiently large compared to the fluid passage cross-sectional areas of the electromagnetic valves, the fluid passage cross-sectional areas of the electromagnetic valves are highly contributive to the orifice of the fluid passages. Then, assuming that A1 represents the fluid passage cross-sectional area of the shut-off valve 41 and A2 represents an equivalent cross-sectional area in consideration of the series connection between the pressure adjustment valve 48 (more precisely, a half of the fluid passage cross-sectional area of the pressure adjustment valve 48 because the pressure-adjustment valve 48 is divided into areas for the two systems) and the communication valve 46, the equivalent cross-sectional area A' of the shut-off valve 41 and the pressure adjustment valve 48 is expressed as A'=A1+A2.

Therefore, the fluid passage cross-sectional area capable of ensuring the pump intake efficiency of the second unit 7 can be achieved by designing the equivalent cross-sectional area A' to a value sufficient as the intake line. Due to this configuration, the brake control apparatus 1 can prevent a reduction in the pressure increasing performance when the pump 214 is actuated while the pump 24 is de-actuated. As a result, the brake control apparatus 1 can prevent a size increase of the shut-off valve 41 and an increase in the power consumption amount, thereby allowing design flexibility to be distributed to a plurality of electromagnetic valves. Further, each of the fluid passages (the communication fluid passage 44 and the like) and the electromagnetic valves (the pressure adjustment valve 48 and the like) in the first unit 6 forming the second intake line are fluid passages and electromagnetic valves necessary to perform the normal brake control in the first unit 6, and therefore the present configuration does not require a new addition of another component and can be realized with a simple structure. Further, from the viewpoint of the power consumption amount, the brake control apparatus 1 can further prevent an increase in the power consumption amount compared to the conventional method of leading to an increase in the size of the coil and including driving the electric cylinder, because the actuator that consumes power, i.e., requires power supply thereto when the second intake line is established is only the communication valve 46 and power supply is not required for the pressure adjustment valve 48 and the motor 215. Further, the pressure adjustment valve 48, which functions as the switching valve for establishing the intake line, is an electromagnetic valve, and this allows the intake line to be established with improved controllability.

Because power is supplied only to the coil of the communication valve 46 in the establishment of the intake line in step S104, even when a failure has occurred in the first unit 6 and the first unit 6 transitions to the backup control state, the intake line may be established when the failed portion is identified and the communication valve 46 is determined to be in a valve-openable state. Detection of such a failure that the hydraulic pressure control in the first unit 6 becomes impossible is embedded in the first control unit 18 as a fail-safe logic for ensuring the system safety, and therefore whether the control can continue is determined according to this detection content. For example, even at the time of occurrence of a failure in the driving function of the motor 25, a failure in the hydraulic pressure sensor 27, a failure in the stroke sensor 12, and the like, the function of driving the communication valve 46 itself is not affected thereby and therefore the intake line can still be established.

On the other hand, possible examples as a failure undesirable for the establishment of the intake line include entry of air into the hydraulic pressure circuit when an outward leak of the brake fluid has occurred. For example, suppose that the wheel cylinder pipe 22a on the front left wheel is broken and an outward leak of the brake fluid has occurred. In this case, air is mixed into the P system according to the outward leak. An attempt to establish the intake line in this state brings the P system and the S system into a connected state via the communication fluid passages 44, thereby raising a possibility that the air mixed in the P system also flows around into the S system. Therefore, in this case, it is preferable that these P and S systems are kept independent of each other and therefore the intake line should not be established. The outward leak of the brake fluid can be detected because causing a reduction in the brake fluid in the reservoir tank 9 and causing the actuation of the fluid level switch 104. Therefore, if a signal indicating a reduction in the fluid level is input from the fluid level switch 104, the first control unit 18 actuates the communication valve 46 in the valve-closing direction and prohibits the establishment of the intake line. The second hydraulic pressure unit 106 also prohibits a control function working so as to autonomously increase the pressure in the vehicle stabilization control because this function is infeasible when an outward leak of the brake fluid has occurred.

[Second Embodiment] A second embodiment has a basic configuration similar to the first embodiment, and therefore will be described focusing on only differences from the first embodiment.

Figure 4:
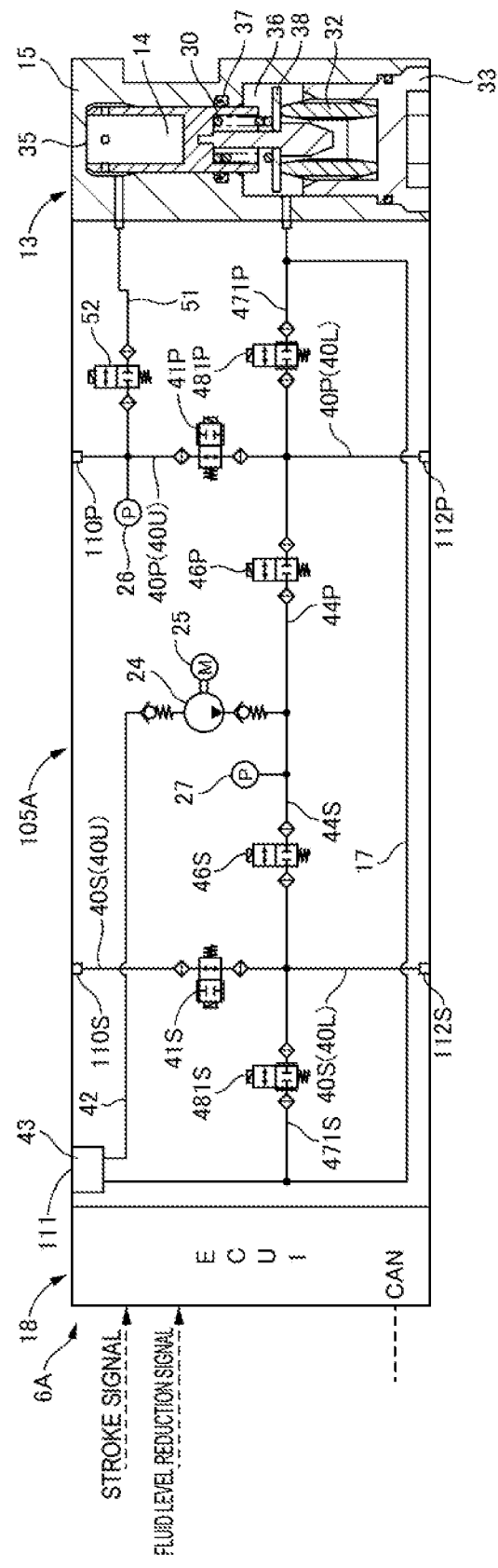
FIG. 4 illustrates the configuration of a first unit 6A according to a second embodiment.

FIG. 4 illustrates the configuration of a first unit 6A according to the second embodiment.

A first hydraulic pressure unit 105A of the first unit 6A includes a pressure reduction fluid passage 471P in the P system, and includes a pressure reduction fluid passage 471S in the S system. Both the pressure reduction fluid passages 471P and 471S are each connected to the return flow fluid passage 17. A pressure adjustment valve (a switching valve) 481P is provided in the pressure reduction fluid passage 471P in the P system, and a pressure adjustment valve (a switching valve) 481S is provided in the pressure reduction fluid passage 471S in the S system. The pressure adjustment valves 481P and 481S are normally-opened proportional control valves. The suction hose 21, the internal fluid pool chamber 43, the return flow passage 17, and the pressure reduction fluid passage 471 are the bypass fluid passage that connects the reservoir tank 9 and the second fluid passage (the downstream-side fluid passage 40L).

When detecting that the target wheel cylinder hydraulic pressure is generated due to the driver's brake operation or the like, the first unit 6A according to the second embodiment actuates the communication valves 46 in the valve-opening directions and actuates the pressure adjustment valve 481P in the P system and the pressure adjustment valve 481S in the S system in the valve-closing directions, at the same time as driving the motor 25 to actuate the pump 24. As a result, the brake fluid discharged from the pump 24 flows from the communication fluid passages 44 to the first connection fluid passages 40. At this time, since the shut-off valves 41 are closed, the brake fluid flows into the unit connection pipes 23 and flows into each of the wheel cylinders 3 via the second hydraulic pressure unit 106, thereby generating the wheel cylinder hydraulic pressure. In this case, the communication fluid passages 44 are in the connected states, and form one system of hydraulic pressure circuit.

Therefore, all of the wheel cylinders 3 have equal wheel cylinder hydraulic pressures therein, and therefore the wheel cylinder hydraulic pressures can be measured by the hydraulic pressure sensor 27. The first control unit 18 controls the inflow amount of the brake fluid into the wheel cylinders 3 based on the rotational speed of the motor 25 according to the hydraulic pressure feedback using the hydraulic pressure sensor 27. At the same time, the first control unit 18 controls the outflow amount by adjusting the opening degrees of the pressure adjustment valve 481P in the P system and the pressure adjustment valve 481S in the S system to cause the brake fluid to flow to the pressure reduction fluid passage 471 side. As a result, the present configuration can arbitrarily increase/reduce the brake fluid amount to be supplied to the wheel cylinders 3, thereby realizing the wheel cylinder hydraulic pressure control aiming at allowing the wheel cylinder hydraulic pressure to match the target wheel cylinder hydraulic pressure.

Figure 5:
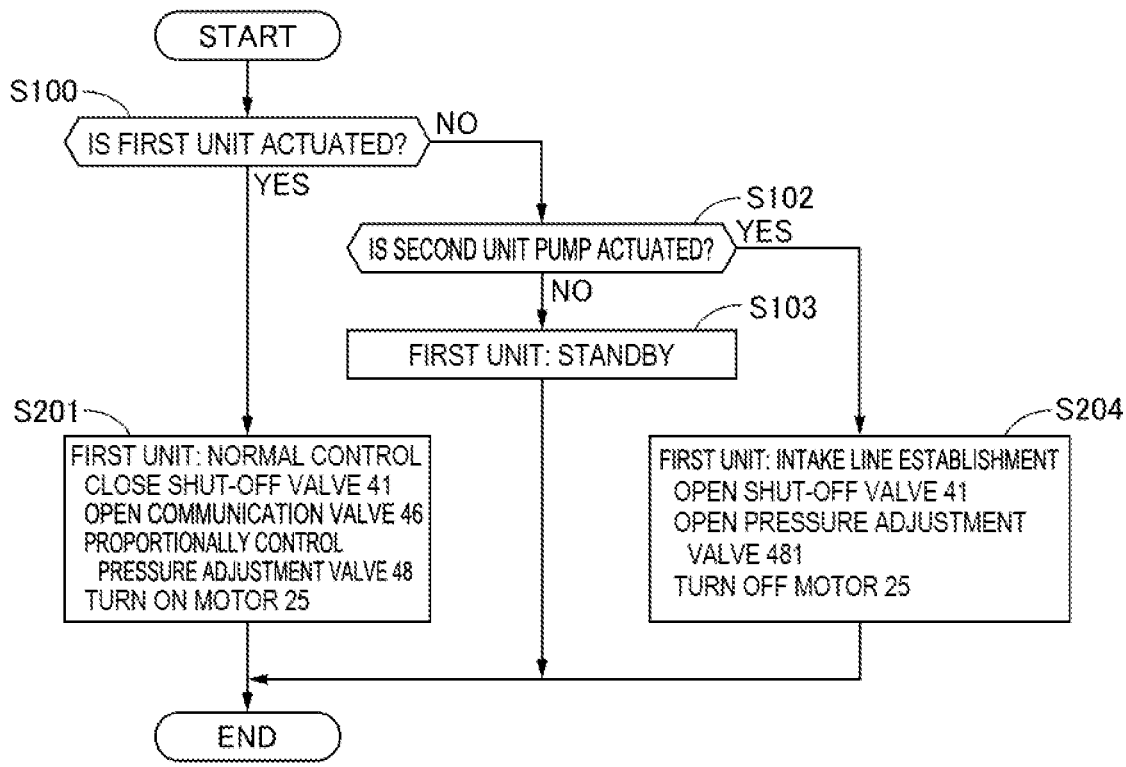
FIG. 5 is a flowchart illustrating a flow of brake control processing by the first control unit 18 according to the second embodiment.

A control operation according to the second exemplary embodiment will be described with reference to a flowchart illustrated in FIG. 5. FIG. 5 is a flowchart illustrating a flow of the brake control processing by the first control unit 18 according to the second embodiment. Steps in which similar processing to the brake control processing according to the first embodiment illustrated in FIG. 3 is performed will be identified by the same step numbers, and descriptions thereof will be omitted here.

In step S201, the first control unit 18 performs the normal brake control by the first unit 6A. More specifically, the first control unit 18 actuates the shut-off valves 41 in the valve-closing directions, actuates the communication valves 46 in the valve-opening directions, proportionally controls at least one of the pressure adjustment valve 481P in the P system or the pressure adjustment valve 481S in the S system, and drives the motor 25.

In step S204, the first control unit 18 sets the first unit 6A into the intake line establishment state. More specifically, the first control unit 18 actuates the shut-off valve 41 and the pressure adjustment valve 481 in the valve-opening directions and de-actuates the motor 25 into the stopped state.

In the second embodiment, the pressure reduction fluid passage 471 is connected to the downstream-side fluid passage 40L of the first connection fluid passage 40, and therefore the second intake line is an intake line starting from the reservoir chamber 100 and reaching the second input port 200 of the second unit 7 via the suction hose 21, the internal fluid pool chamber 43, the return flow passage 17, the pressure reduction fluid passage 471 including the pressure adjustment valve 481, the downstream-side fluid passage 40L, and the unit connection pipe 23. This eliminates the necessity of actuating the communication valve 46 in the valve-opening direction when the second intake line is established in the second embodiment. Therefore, in the second embodiment, the brake control apparatus allows the intake line to be established by keeping all the actuators in the first unit 6A in states that no power is supplied thereto, and therefore can reduce the power consumption amount when the intake line is established compared to the first embodiment.

[Third Embodiment] A third embodiment has a basic configuration similar to the first embodiment, and therefore will be described focusing only on differences from the first embodiment.

Figure 6:
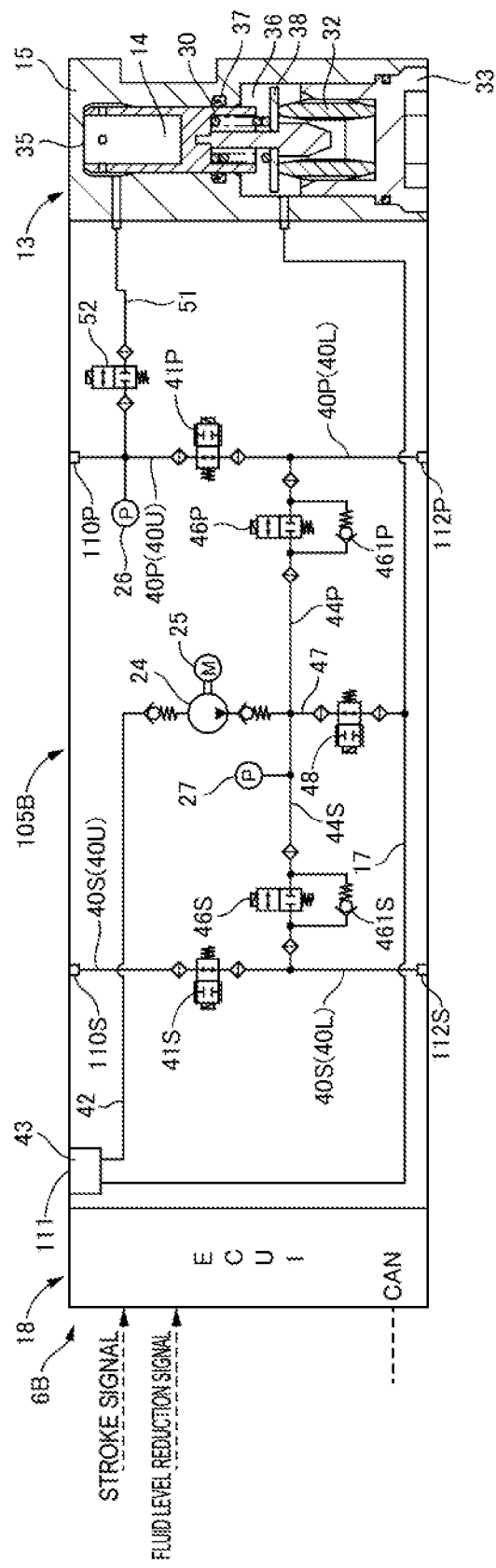
FIG. 6 illustrates the configuration of a first unit 6B according to a third embodiment.

FIG. 6 illustrates the configuration of a first unit 6B according to the third embodiment.

A check valve (a switching valve) 461 is provided in each of the communication fluid passages 44 in parallel with the communication valve 46 in a first hydraulic pressure unit 105B of the first unit 6B. The check valve 461 permits only a flow of the brake fluid in the direction directed from the intake fluid passage 42 and the pressure reduction fluid passage 47 to the downstream-side fluid passage 40L and prohibits a flow of the brake fluid directed from the downstream-side fluid passage 40L to the intake fluid passage 42 and the pressure reduction fluid passage 47. The check valve 461 is a cup seal provided in the communication valve 46. The check valve 461 may be prepared by setting up a valve structured like a ball check valve in parallel.

The brake control processing according to the third embodiment is similar to the brake control processing according to the first embodiment illustrated in FIG. 3, but the communication valve 46 does not have to be actuated in the valve-opening direction when the intake line is established in step S104 in the third embodiment.

When the pump 214 is actuated, a negative pressure is generated in the downstream-side fluid passage 40L due to the intake negative pressure. On the other hand, because the return flow fluid passage 17 has an atmospheric pressure therein, the check valve 461 is brought into the valve-opened state due to a differential pressure (the atmospheric pressure–the intake negative pressure), and the second intake line is established. The second intake line is an intake line starting from the reservoir chamber 100 and reaching the second input port 200 of the second unit 7 via the suction hose 21, the internal fluid pool chamber 43, the return flow fluid passage 17, the pressure reduction fluid passage 47 including the pressure adjustment valve 48, the check valve 461, the downstream-side fluid passage 40L, and the unit connection pipe 23. Therefore, in the third embodiment, the brake control apparatus allows the intake line to be established by keeping all the actuators in the first unit 6B in states that no power is supplied thereto, and therefore can reduce the power consumption amount when the intake line is established compared to the first embodiment.

Further, even when the first control unit 18 is subjected to a failure making all the actuators in the first unit 6B inoperable, such as a loss of the power source of the first control unit 18, the brake control apparatus can prevent a reduction in the intake efficiency of the pump 214.

[Fourth Embodiment] A fourth embodiment has a basic configuration similar to the first embodiment, and therefore will be described focusing on only differences from the first embodiment.

Figure 7:
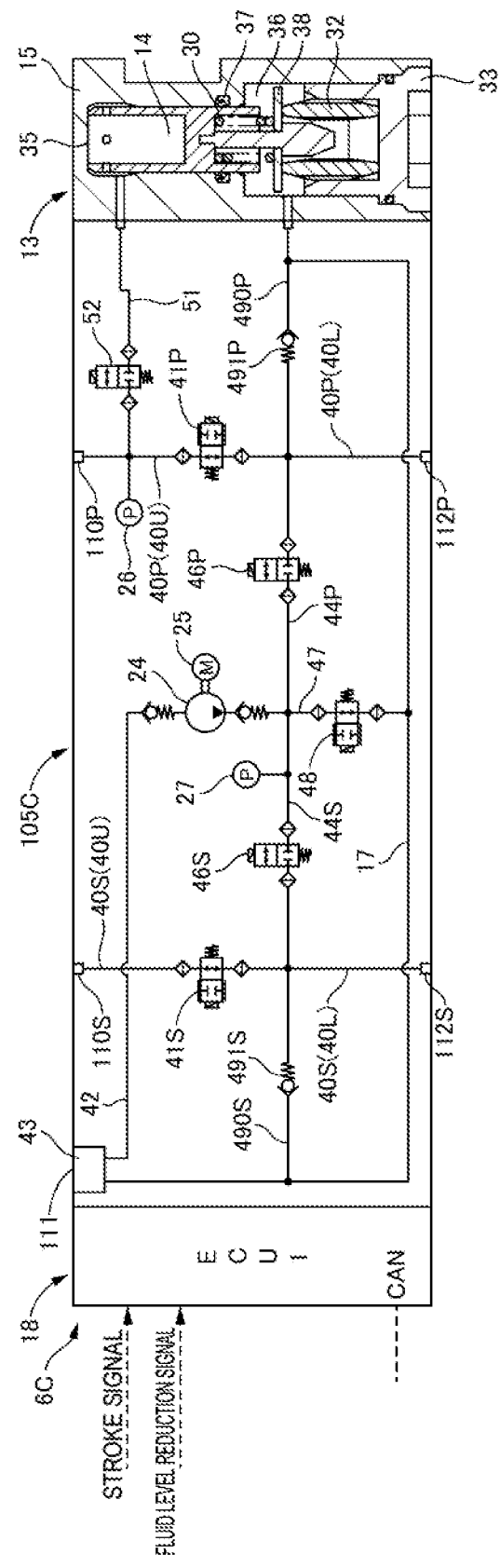
FIG. 7 illustrates the configuration of a first unit 6C according to a fourth embodiment.

FIG. 7 illustrates the configuration of a first unit 6C according to the fourth embodiment.

A first hydraulic pressure unit 105C of the first unit 6C includes a pressure reduction fluid passage 490P in the P system, and includes a pressure reduction fluid passage 490S in the S system. Both the pressure reduction fluid passages 490P and 490S are each connected to the return flow fluid passage 17. A check valve (a switching valve) 491P is provided in the pressure reduction fluid passage 490P in the P system, and a check valve (a switching valve) 491S is provided in the pressure reduction fluid passage 490S in the S system. The check valve 491 permits only a flow of the brake fluid in the direction directed from the intake fluid passage 17 to the downstream-side fluid passage 40L and prohibits a flow of the brake fluid directed from the downstream-side fluid passage 40L to the return flow fluid passage 17. The suction hose 21, the internal fluid pool chamber 43, the return flow passage 17, and the pressure reduction fluid passage 490 are the bypass fluid passage that connects the reservoir tank 9 and the second fluid passage (the downstream-side fluid passage 40L).

The brake control processing according to the fourth embodiment is similar to the brake control processing according to the second embodiment illustrated in FIG. 5, but the communication valve 46 does not have to be actuated in the valve-opening direction when the intake line is established in step S104 in the fourth embodiment.

When the pump 214 is actuated, a negative pressure is generated in the downstream-side fluid passage 40L due to the intake negative pressure. On the other hand, because the return flow fluid passage 17 has an atmospheric pressure therein, the check valve 491 is brought into the valve-opened state due to a differential pressure (the atmospheric pressure–the intake negative pressure), and the second intake line is established. The second intake line is an intake line starting from the reservoir chamber 100 and reaching the second input port 200 of the second unit 7 via the suction hose 21, the internal fluid pool chamber 43, the return flow fluid passage 17, the pressure reduction fluid passage 490 including the check valve 491, the downstream-side fluid passage 40L, and the unit connection pipe 23. Therefore, in the fourth embodiment, the brake control apparatus allows the intake line to be established by keeping all the actuators in the first unit 6C in states that no power is supplied thereto, and therefore can reduce the power consumption amount when the intake line is established compared to the second embodiment.

Further, even when the first control unit 18 is subjected to a failure making all the actuators in the first unit 6C inoperable, such as a loss of the power source of the first control unit 18, the brake control apparatus can prevent a reduction in the intake efficiency of the pump 214.

[Fifth Embodiment] A fifth embodiment has a basic configuration similar to the first embodiment, and therefore will be described focusing on only differences from the first embodiment.

Figure 8:
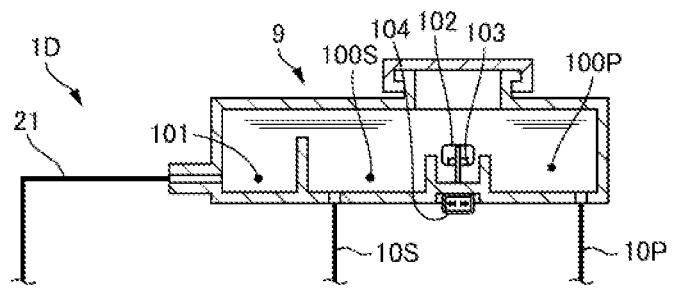
FIG. 8 illustrates the configuration of a reservoir 9 in a brake control apparatus 1D according to a fifth embodiment.
Figure 9:
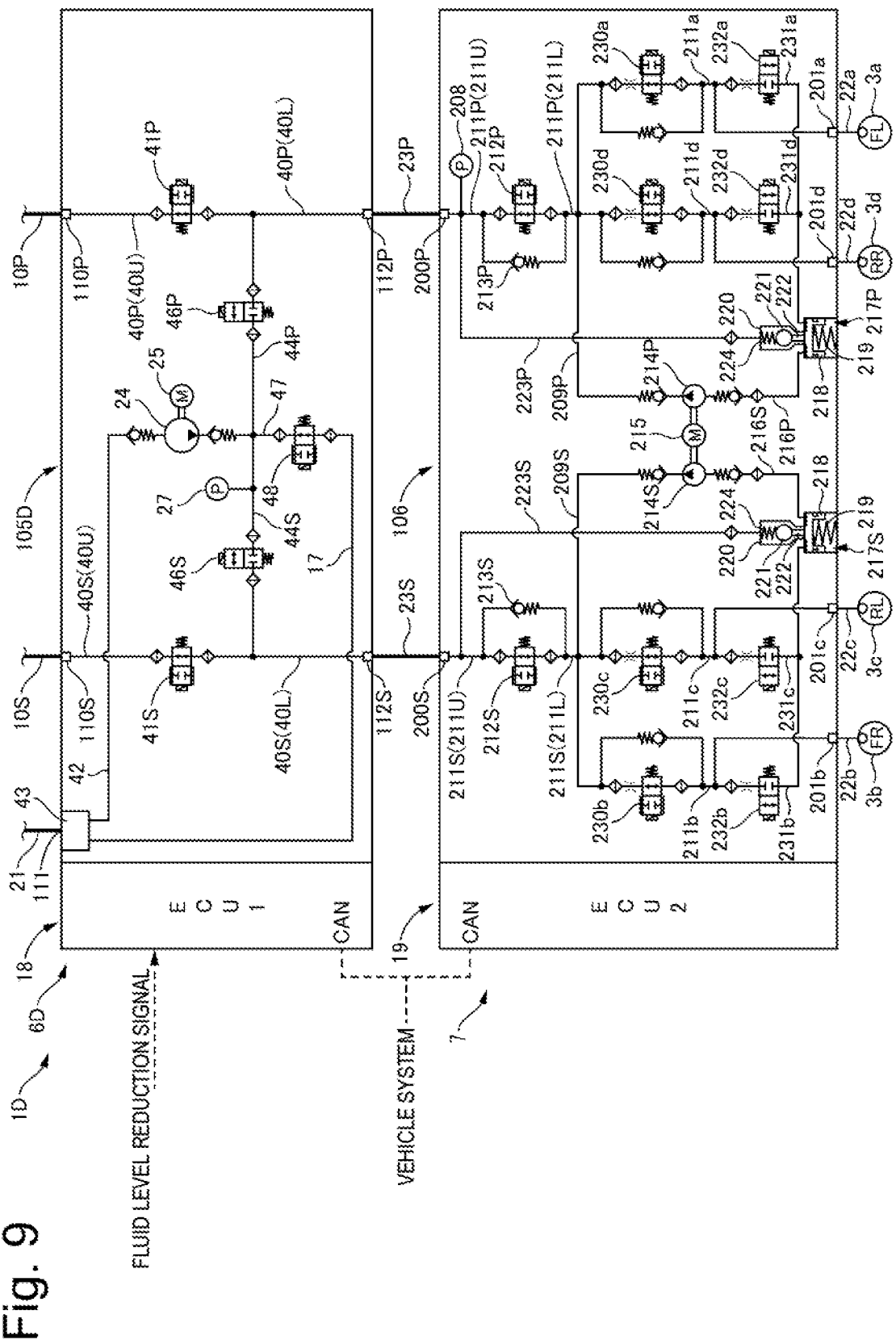
FIG. 9 illustrates the configurations of the first unit 6 and the second unit 7 in the brake control apparatus 1D according to the fifth embodiment.

FIG. 8 illustrates the configuration of the reservoir tank 9 in a brake control apparatus 1D according to the fifth embodiment. FIG. 9 illustrates the configurations of the first unit 6 and the second unit 7 in the brake control apparatus 1D according to the fifth embodiment.

The brake control apparatus 1D according to the fifth embodiment includes no master cylinder and no brake pedal. The brake control apparatus 1D is applied to a fully autonomously driven vehicle in which a driver is not involved in driving and a vehicle system autonomously performs all driving operations. The brake control apparatus 1D receives an instruction from the vehicle system via communication such as a CAN and performs autonomous brake control. The first unit 6D does not include a function relating to a driver's pedal input (a stroke simulator, a simulator valve, and a hydraulic pressure sensor that detects a master cylinder hydraulic pressure). The brake control apparatus 1D does not include a master cylinder, and therefore a first hydraulic pressure unit 105D is directly connected to the reservoir chamber 100 in the reservoir tank 9 via a master cylinder pipe 10D.

The first control unit 18 realizes the wheel cylinder hydraulic pressure control by actuating each of the actuators in the first hydraulic pressure unit 105D according to the target wheel cylinder hydraulic pressure instructed from the vehicle system via the communication and using the value detected by the hydraulic pressure sensor 27 for the feedback. The target value of the autonomous brake may be any physical amount regarding braking, such as an acceleration and a deceleration of the vehicle. In other words, the operation of the first hydraulic pressure unit 105D is autonomous brake and operates in a similar manner to the first embodiment, and therefore the description thereof will be omitted here.

The configuration and the functions of the second unit 7 are similar to the first embodiment, and the fifth embodiment brings about similar advantageous effects to the first embodiment by establishing the intake line based on the brake control processing illustrated in FIG. 3 when the pump 214 of the second unit 7 is actuated.

Other Embodiments

Having described the embodiments for implementing the present invention, the specific configuration of the present invention is not limited to the configurations of the embodiments, and the present invention also includes even a design modification and the like thereof made within a range that does not depart from the spirit of the present invention, if any.

For example, the embodiments have been described assuming that the constituent components such as the master cylinder and the first and second hydraulic pressure units are each an independent hydraulic pressure unit or control unit, but may be configured in such a manner that these components are integrated or divided unless no change arises in the assignment regarding the functions of the first and second control unit.

The embodiments have been described assuming that the first hydraulic pressure source of the first hydraulic pressure unit is a plunger pump, but the first hydraulic pressure source of the first hydraulic pressure unit may be an electric piston actuated by an electric motor.

The embodiments have been described citing an example in which the second hydraulic pressure unit is an electronic stability controller, but the second hydraulic pressure unit is not limited to the electronic stability controller as long as being configured to suck the brake fluid in the first connection fluid passage by the second hydraulic pressure source to increase the pressure in each wheel cylinder. For example, the second hydraulic pressure unit may be a redundant unit of the autonomous brake that is configured to be able to increase the pressure in each wheel cylinder with the same pressure even if being unable to control each wheel cylinder independently.

The brake control apparatus may be configured to control each of the actuators in the first hydraulic pressure unit on the second control unit side when establishing the intake line.

In the following description, technical ideas recognizable from the above-described embodiments will be described.

A brake control apparatus, in one configuration thereof, includes a connection fluid passage connecting a reservoir tank and a braking force application portion configured to apply a braking force to a wheel according to a brake hydraulic pressure, a shut-off valve provided in the connection fluid passage, a first fluid passage that is a fluid passage between the shut-off valve and the braking force application portion in the connection fluid passage, a gate valve provided in the first fluid passage, a second fluid passage that is a fluid passage between the shut-off valve and the gate valve in the first fluid passage, a first brake fluid supply fluid passage connecting the reservoir tank and the second fluid passage, a first hydraulic pressure source provided in the brake fluid supply fluid passage, a third fluid passage that is a fluid passage between the gate valve and the braking force application portion in the first fluid passage, a second brake fluid supply fluid passage connecting the second fluid passage and the third fluid passage, a second hydraulic pressure source provided in the second brake fluid supply fluid passage, a bypass fluid passage connecting the reservoir tank and the second fluid passage, a control unit configured to actuate the shut-off valve in a valve-opening direction and actuate the second hydraulic pressure source when the first hydraulic pressure source is in a de-actuated state and a request to actuate the second hydraulic pressure source is input, and a switching valve provided in the bypass fluid passage and configured to be brought into a valve-opened state after the second hydraulic pressure source is actuated by the control unit.

According to a further preferable configuration, in the above-described configuration, the switching valve is an electromagnetic valve configured to be actuated in a valve-opening direction by the control unit.

According to another preferable configuration, in any of the above-described configurations, the brake control apparatus further includes a communication valve between the first hydraulic pressure source and the second fluid passage in the first brake fluid supply fluid passage. The bypass fluid passage is connected to the second fluid passage via the first brake fluid supply fluid passage. The electromagnetic valve is a pressure adjustment valve configured in such a manner that a valve-opened amount thereof is adjusted by the control unit.

According to further another preferable configuration, in any of the above-described configurations, the control unit actuates the shut-off valve, the communication valve, and the pressure adjustment valve in valve-opening directions after actuating the second hydraulic pressure source.

According to further another preferable configuration, in any of the above-described configurations, the control unit actuates the communication valve in a valve-closing direction if detecting a reduction in a fluid level of brake fluid stored in the reservoir tank.

According to further another preferable configuration, in any of the above-described configurations, the bypass fluid passage is connected to the second fluid passage independently of the first brake fluid supply fluid passage.

According to further another preferable configuration, in any of the above-described configurations, the control unit actuates the electromagnetic valve in the valve-opening direction after actuating the second hydraulic pressure source regardless of whether a failure has occurred in the first hydraulic pressure source.

According to further another preferable configuration, in any of the above-described configurations, the switching valve is a one-way valve that permits only a flow of the brake fluid from one side where the reservoir tank is located to the other side where the second fluid passage is located in the bypass fluid passage.

Further, from another aspect, a brake control apparatus, in one configuration thereof, includes a connection fluid passage connecting a reservoir tank and a braking force application portion configured to apply a braking force to a wheel according to a brake hydraulic pressure, a shut-off valve provided in the connection fluid passage, a first fluid passage that is a fluid passage between the shut-off valve and the braking force application portion in the connection fluid passage, a gate valve provided in the first fluid passage, a second fluid passage that is a fluid passage between the shut-off valve and the gate valve in the first fluid passage, a first brake fluid supply fluid passage connecting the reservoir tank and the second fluid passage, a first hydraulic pressure source provided in the brake fluid supply fluid passage, a third fluid passage that is a fluid passage between the gate valve and the braking force application portion in the first fluid passage, a second brake fluid supply fluid passage connecting the second fluid passage and the third fluid passage, a second hydraulic pressure source provided in the second brake fluid supply fluid passage, a bypass fluid passage connecting the reservoir tank and the second fluid passage, a control unit configured to actuate the shut-off valve in a valve-opening direction and actuate the second hydraulic pressure source, and a switching valve provided in the bypass fluid passage and configured to be brought into a valve-opened state when a negative pressure is generated in the second fluid passage after the second hydraulic pressure source is actuated by the control unit.

Further, from another aspect, a brake control apparatus, in one configuration thereof, includes a first hydraulic pressure unit and a second hydraulic pressure unit. The first hydraulic pressure unit includes a first input port connected to a reservoir tank, a first connection fluid passage connected to the first input port, a first output port connected to the first connection fluid passage, a shut-off valve provided in the first connection fluid passage, a first brake fluid supply fluid passage connecting the reservoir tank and a fluid passage between the shut-off valve and the first output port in the first connection fluid passage, a first hydraulic pressure source provided in the brake fluid supply fluid passage, a bypass fluid passage connecting the reservoir tank and the fluid passage between the shut-off valve and the first output port in the first connection fluid passage, a switching valve provided in the bypass fluid passage, and a first control unit configured to actuate the shut-off valve in a valve-opening direction. The second hydraulic pressure unit includes a second input port connected to the first output port, a second connection fluid passage connected to the second input port, a second output port connecting the first connection fluid passage and a braking force application portion configured to apply a braking force to a wheel according to a brake hydraulic pressure, a gate valve provided in the second connection fluid passage, a second brake fluid supply fluid passage connecting a fluid passage between the second output port and the gate valve in the second connection fluid passage and a fluid passage between the gate valve and the second output port in the second connection fluid passage, a second hydraulic pressure source provided in the second brake fluid supply fluid passage, and a second control unit configured to actuate the second hydraulic pressure source. The switching valve is brought into a valve-opened state after the shut-off valve is actuated in the valve-opening direction by the first control unit and the second hydraulic pressure source is actuated by the second control unit, when the first hydraulic pressure source is in a de-actuated state and a request to actuate the second hydraulic pressure source is input.

Preferably, in the above-described configuration, the second hydraulic pressure unit is an electronic stability controller that prevents skidding of a vehicle.

According to another preferable configuration, in any of the above-described configurations, the first input port is connected to the reservoir tank via a master cylinder.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2019-216463 filed on Nov. 29, 2019. The entire disclosure of Japanese Patent Application No. 2019-216463 filed on Nov. 29, 2019 including the specification, the claims, the drawings, and the abstract is incorporated herein by reference in its entirety.

REFERENCE SIGNS LIST

1 brake control apparatus
1D brake control apparatus
2 master cylinder
3 wheel cylinder (braking force application portion)
9 reservoir tank
10 master cylinder pipe (connection fluid passage)
16 master cylinder fluid chamber (connection fluid passage)
18 first control unit (control unit)
19 second control unit (control unit)
21 suction hose (first brake fluid supply fluid passage)
22 wheel cylinder pipe (connection fluid passage, first fluid passage, and third fluid passage)
23 unit connection pipe (connection fluid passage, first fluid passage, and second fluid passage)
24 pump (first hydraulic pressure source)

40 first connection fluid passage (connection fluid passage)
40L downstream-side fluid passage (first fluid passage and second fluid passage)
41 shut-off valve
42 intake fluid passage (first brake fluid supply fluid passage)
43 internal fluid pool chamber (first brake fluid supply fluid passage)
44 communication fluid passage (first brake fluid supply fluid passage)
46 communication valve
48 pressure adjustment valve (switching valve)
105 first hydraulic pressure unit
106 second hydraulic pressure unit
110 first input port
112 first output port
200 second input port
201 second output port
209 discharge fluid passage (second brake fluid supply fluid passage)
211 second connection fluid passage (connection fluid passage and first fluid passage)
211L downstream-side fluid passage (downstream-side fluid passage 211L)
211U upstream-side fluid passage (second fluid passage)
212 gate valve
214 P-system pump (second hydraulic pressure source)
214S S-system pump (second hydraulic pressure source)
216 intake fluid passage (second brake fluid supply fluid passage)
223 intake connection fluid passage (second brake fluid supply fluid passage)
461 check valve (switching valve)
481 pressure adjustment valve (switching valve)
491 check valve (switching valve)
FL to RR wheel

The invention claimed is:

1. A brake control apparatus comprising:
a connection fluid passage that connects a reservoir tank and a braking force application portion, the braking force application portion being configured to apply a braking force to a wheel according to a brake hydraulic pressure;
a shut-off valve provided in the connection fluid passage;
a first fluid passage, the first fluid passage being a fluid passage between the shut-off valve and the braking force application portion in the connection fluid passage;
a gate valve provided in the first fluid passage;
a second fluid passage, the second fluid passage being a fluid passage between the shut-off valve and the gate valve in the first fluid passage;
a first brake fluid supply fluid passage that connects the reservoir tank and the second fluid passage;
a first hydraulic pressure source provided in the first brake fluid supply fluid passage;
a third fluid passage, the third fluid passage being a fluid passage between the gate valve and the braking force application portion in the first fluid passage;
a second brake fluid supply fluid passage that connects the second fluid passage and the third fluid passage;
a second hydraulic pressure source provided in the second brake fluid supply fluid passage;
a bypass fluid passage that connects the reservoir tank and the second fluid passage;
a control unit configured to actuate the shut-off valve in a valve-opening direction and actuate the second hydraulic pressure source when the first hydraulic pressure source is in a de-actuated state and a request to actuate the second hydraulic pressure source is input; and
a switching valve provided in the bypass fluid passage and configured to be brought into a valve-opened state after the second hydraulic pressure source is actuated by the control unit.

2. The brake control apparatus according to claim 1, wherein the switching valve is an electromagnetic valve configured to be actuated in a valve-opening direction by the control unit.

3. The brake control apparatus according to claim 2, further comprising a communication valve between the first hydraulic pressure source and the second fluid passage in the first brake fluid supply fluid passage,
wherein the bypass fluid passage is connected to the second fluid passage via the first brake fluid supply fluid passage, and
wherein the electromagnetic valve is a pressure adjustment valve configured in such a manner that a valve-opened amount thereof is adjusted by the control unit.

4. The brake control apparatus according to claim 3, wherein the control unit actuates the shut-off valve, the communication valve, and the pressure adjustment valve in valve-opening directions after actuating the second hydraulic pressure source.

5. The brake control apparatus according to claim 4, wherein the control unit actuates the communication valve in a valve-closing direction if detecting a reduction in a fluid level of brake fluid stored in the reservoir tank.

6. The brake control apparatus according to claim 2, wherein the bypass fluid passage is connected to the second fluid passage independently of the first brake fluid supply fluid passage.

7. The brake control apparatus according to claim 4, wherein the control unit actuates the electromagnetic valve in the valve-opening direction after actuating the second hydraulic pressure source regardless of whether a failure has occurred in the first hydraulic pressure source.

8. The brake control apparatus according to claim 1, wherein the switching valve is a one-way valve that permits only a flow of the brake fluid from one side where the reservoir tank is located to the other side where the second fluid passage is located in the bypass fluid passage.

9. A brake control apparatus comprising:
a connection fluid passage that connects a reservoir tank and a braking force application portion, the braking force application portion being configured to apply a braking force to a wheel according to a brake hydraulic pressure;
a shut-off valve provided in the connection fluid passage;
a first fluid passage, the first fluid passage being a fluid passage between the shut-off valve and the braking force application portion in the connection fluid passage;
a gate valve provided in the first fluid passage;
a second fluid passage, the second fluid passage being a fluid passage between the shut-off valve and the gate valve in the first fluid passage;
a first brake fluid supply fluid passage that connects the reservoir tank and the second fluid passage;
a first hydraulic pressure source provided in the first brake fluid supply fluid passage;

a third fluid passage, the third fluid passage being a fluid passage between the gate valve and the braking force application portion in the first fluid passage;
a second brake fluid supply fluid passage that connects the second fluid passage and the third fluid passage;
a second hydraulic pressure source provided in the second brake fluid supply fluid passage;
a bypass fluid passage that connects the reservoir tank and the second fluid passage;
a control unit configured to actuate the shut-off valve in a valve-opening direction and actuate the second hydraulic pressure source; and
a switching valve provided in the bypass fluid passage and configured to be brought into a valve-opened state when a negative pressure is generated in the second fluid passage after the second hydraulic pressure source is actuated by the control unit.

10. A brake control apparatus comprising:
a first hydraulic pressure unit; and
a second hydraulic pressure unit,
wherein the first hydraulic pressure unit includes
a first input port connected to a reservoir tank,
a first connection fluid passage connected to the first input port,
a first output port connected to the first connection fluid passage,
a shut-off valve provided in the first connection fluid passage,
a first brake fluid supply fluid passage that connects the reservoir tank and a fluid passage between the shut-off valve and the first output port in the first connection fluid passage,
a first hydraulic pressure source provided in the first brake fluid supply fluid passage,
a bypass fluid passage that connects the reservoir tank and the fluid passage between the shut-off valve and the first output port in the first connection fluid passage,
a switching valve provided in the bypass fluid passage, and
a first control unit configured to actuate the shut-off valve in a valve-opening direction,
wherein the second hydraulic pressure unit includes
a second input port connected to the first output port,
a second connection fluid passage connected to the second input port,
a second output port that connects the first connection fluid passage and a braking force application portion configured to apply a braking force to a wheel according to a brake hydraulic pressure,
a gate valve provided in the second connection fluid passage,
a second brake fluid supply fluid passage that connects a fluid passage between the second output port and the gate valve in the second connection fluid passage and a fluid passage between the gate valve and the second output port in the second connection fluid passage,
a second hydraulic pressure source provided in the second brake fluid supply fluid passage, and
a second control unit configured to actuate the second hydraulic pressure source, and
wherein the switching valve is brought into a valve-opened state after the shut-off valve is actuated in the valve-opening direction by the first control unit and the second hydraulic pressure source is actuated by the second control unit, when the first hydraulic pressure source is in a de-actuated state and a request to actuate the second hydraulic pressure source is input.

11. The brake control apparatus according to claim 10, wherein the second hydraulic pressure unit is an electronic stability controller that prevents skidding of a vehicle.

12. The brake control apparatus according to claim 10, wherein the first input port is connected to the reservoir tank via a master cylinder.

* * * * *